(12) United States Patent
Klausberger et al.

(10) Patent No.: US 8,391,179 B2
(45) Date of Patent: Mar. 5, 2013

(54) METHOD AND DEVICE FOR DATA COMMUNICATION AND COMMUNICATION SYSTEM COMPRISING SUCH DEVICE

(75) Inventors: Walter Klausberger, Wolfpassing (AT); Werner Kozek, Vienna (AT)

(73) Assignee: Nokia Siemens Network Oy, Espoo (FI)

( * ) Notice: Subject to any disclaimer, the term of this patent is extended or adjusted under 35 U.S.C. 154(b) by 277 days.

(21) Appl. No.: 12/667,173

(22) PCT Filed: Jun. 19, 2008

(86) PCT No.: PCT/EP2008/057805
§ 371 (c)(1),
(2), (4) Date: Dec. 29, 2009

(87) PCT Pub. No.: WO2009/003849
PCT Pub. Date: Jan. 8, 2009

(65) Prior Publication Data
US 2010/0157849 A1    Jun. 24, 2010

(30) Foreign Application Priority Data
Jun. 29, 2007    (EP) .................................... 07012855

(51) Int. Cl.
*H04L 12/28* (2006.01)
(52) U.S. Cl. ........................................................ 370/254
(58) Field of Classification Search .................. None
See application file for complete search history.

(56) References Cited

U.S. PATENT DOCUMENTS

| | | | | |
|---|---|---|---|---|
| 6,904,054 B1* | 6/2005 | Baum et al. | ................... | 370/467 |
| 7,200,114 B1* | 4/2007 | Tse-Au | ......................... | 370/231 |
| 7,239,628 B1* | 7/2007 | Pendleton et al. | ............ | 370/352 |
| 7,269,348 B1* | 9/2007 | Tse-Au | ......................... | 398/25 |
| 7,778,220 B2* | 8/2010 | Sastry | ........................... | 370/329 |
| 7,940,870 B2* | 5/2011 | Van De Wiel et al. | ......... | 375/346 |
| 2002/0095484 A1* | 7/2002 | Pagani et al. | ................. | 709/220 |
| 2006/0193295 A1 | 8/2006 | White et al. | | |
| 2008/0212495 A1* | 9/2008 | Stirbu | ........................... | 370/254 |
| 2009/0103559 A1* | 4/2009 | Pickering et al. | ............. | 370/463 |

FOREIGN PATENT DOCUMENTS

WO    2005122477 A1    12/2005

OTHER PUBLICATIONS

ITU-T Recommendation G.993.1 (Jun. 2004): Series G: Transmission Systems and Media, Digital Systems and Networks—Digital sections and digital line system—Access networks—Very high speed digital subscriber line transceivers.
ITU-T Recommendation G.993.2 (Feb. 2006): Series G: Transmission Systems and Media, Digital Systems and Networks—Digital sections and digital line system—Access networks—Very high speed digital subscriber line transceivers 2 (VDSL2).

* cited by examiner

*Primary Examiner* — Ayaz Sheikh
*Assistant Examiner* — Blanche Wong
(74) *Attorney, Agent, or Firm* — Laurence A. Greenberg; Werner H. Stemer; Ralph E. Locher

(57) ABSTRACT

A method and a device for data communication between a first instance and a network are provided, wherein the first instance is connected via a first interface with the network. In the novel method, the first instance is connected with the network via at least one second interface.

11 Claims, 2 Drawing Sheets

METHOD AND DEVICE FOR DATA COMMUNICATION AND COMMUNICATION SYSTEM COMPRISING SUCH DEVICE

The invention relates to a method and to a device for data communication and to a communication system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream—12 Mbit/s in upstream with asymmetric access.

Currently, standard VDSL uses up to 4 different frequency bands, two for upstream (from the client to the telecom provider) and two for downstream. The underlying modulation technique is DMT (discrete multitone modulation), wherein each tone carries a specified number of bits that are incorporated into a complex QAM (quadrature amplitude modulation) symbol.

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide band modulation approaches are problematic relating to crosstalk interference that is introduced to the twisted pair transmission line and received by the modem.

xDSL lines are arranged as point-to-point connections. At the Central Office (CO) or Digital Subscriber Line Access Multiplexer (DSLAM) lines are adjacent to one another, sometimes even within the same multi-core cable. Hence, at the CO/DSLAM a common management of these lines may be applicable for efficiency purposes.

However, on the user side, i.e. at the Customer-Premises Equipment (CPE), there are predominately single lines connecting different subscribers. Hence, it is disadvantageous that at the far-end there are currently no mechanisms applicable to increase an efficiency of the data communication.

The problem to be solved is to overcome the disadvantages as stated before and to provide an approach for data communication that allows an efficient processing of data at the far-end, in particular at the customer-premises equipment.

This problem is solved according to the features of the independent claims. Further embodiments result from the depending claims.

In order to overcome this problem, a method for data communication between a first instance and a network is provided, wherein the first instance is connected via a first interface with the network, the method comprising the step:

the first instance is connected with the network via at least one second interface.

Hence, load-sharing or balancing mechanism can be applied by utilizing more than one interface of or at the first instance.

In an embodiment, the first instance is an equipment at a customer premises, in particular a CPE (Customer-Premises Equipment).

In another embodiment, the first instance is connected via the at least one second interface to a second instance. Optionally, several instances can be connected via the at least one second interface.

In a further embodiment, the second instance is of the following type:

a customer-premises equipment;
a mobile terminal.

Hence, the first instance can set up a connection to the second instance via its second interface thereby distributing the traffic via its first interface to the network and via its second interface through the second instance to the network. Preferably, the second instance has a connection to the network on its own.

In a next embodiment, the at least one second interface comprises:

a wireless interface;
a powerline interface;
a wired interface.

Advantageously, via each such second interface type a particular connection to a second instance of such type is set up and utilized for accessing the network via at least one additional connection.

It is also an embodiment that the first instance is connected via an ad-hoc channel and/or via an ad-hoc network via the at least one second interface.

Such ad-hoc channel and/or ad-hoc network may be utilized to connect directly to said second instance, which preferably has a connection to the network that can be utilized.

Pursuant to another embodiment, the at least one second interface is utilized for distributing traffic in particular in upstream direction.

Hence, the first and the second interfaces can be used (via, e.g., the second instance) to convey traffic from the first instance to the network. This is in particular useful as traffic in upstream direction often is a bottleneck due to its limited bandwidth (compared to downstream traffic band-width). Via this approach several such upstream channels may be used and/or combined in order to achieve a higher overall bandwidth.

According to an embodiment, an instance of the network utilizes the first interface and the at least one second interface of the first instance. Said instance of the network may in particular be a Central Office (CO) or a Digital Subscriber Line Access Multiplexer (DSLAM).

This bears the advantage that the instance of the network is able to distribute the traffic according to the multitude of interfaces available thereby increasing an overall traffic forwarded downstream towards the first instance.

Another advantage of this approach is the resiliency: In case one connection to the network breaks down, there still may be at least one other connection that can be used for keeping up the traffic.

According to another embodiment, the network is a commonly usable network, in particular the Internet.

The problem stated above is also solved by a device for data processing comprising a processor unit that is arranged such that the method as described herein is executable on said processor unit.

As an embodiment, said device is a communication device, in particular a customer-premises equipment comprising a first interface and at least one second interface.

The first interface and the at least one second interface can be directly or indirectly, e.g., via a second instance, connected to the network, in particular to the Internet.

The problem stated supra can also be solved by a communication system comprising the device as described herein.

Figure 1:
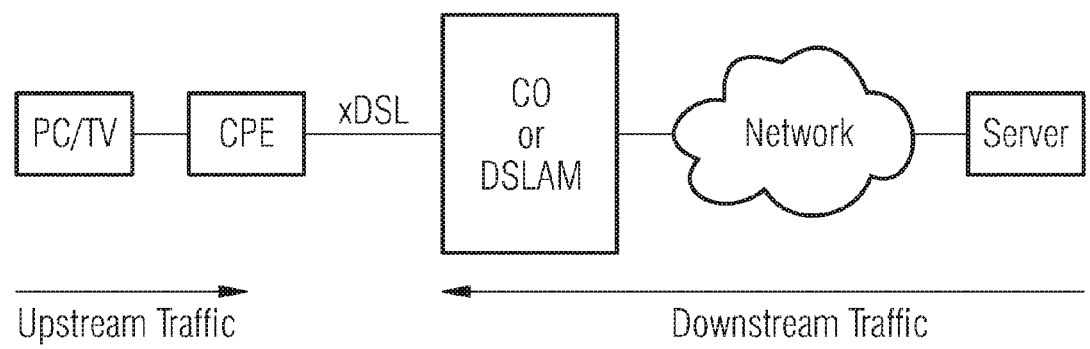
FIG. 1 shows a scenario comprising a communication network allowing to send data from a server to a client in particular via an xDSL connection.

A scenario of a communication network is shown in FIG. 1. Downstream Traffic is conveyed from the Server via a Network to a Central Office or Digital Subscriber Line Access Multiplexer CO/DSLAM. The CO/DSLAM is further connected via a digital subscriber line xDSL to a Customer-Premises Equipment CPE. The digital subscriber line connection can be in particular of the following type:

Asymmetric Digital Subscriber Line ADSL, ADSL2, ADSL2+;
High Data Rate Digital Subscriber Line HDSL;
Very High Speed Digital Subscriber Line VDSL, VDSL2.

The customer can be connected to the Customer-Premises Equipment CPE via a set-top box and a television or via a personal computer PC/TV. Data that is sent from the PC/TV towards the Server is referred to as Upstream Traffic.

Figure 2:
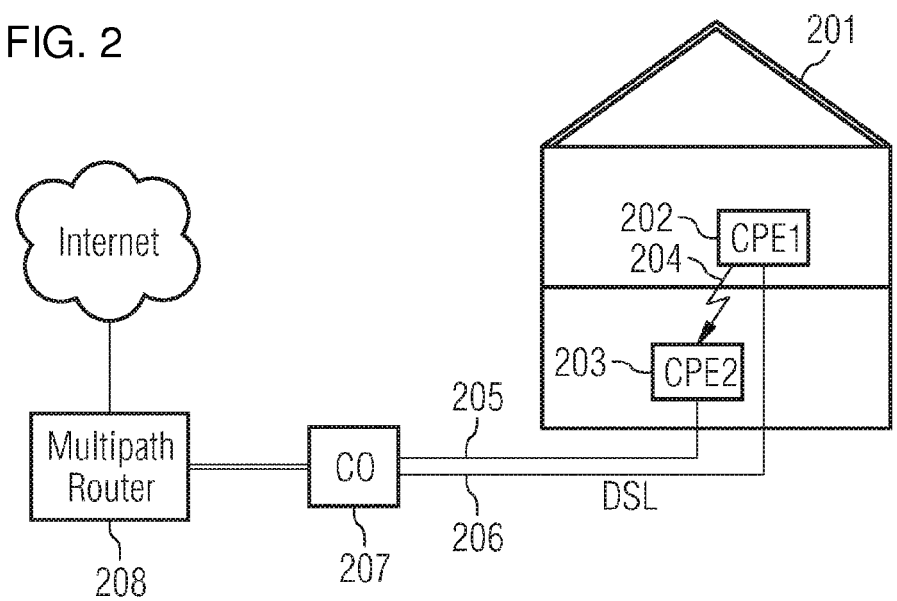
FIG. 2 shows a scenario comprising to customer premises equipment (CPE) each being connected to a central office, wherein additional bandwidth is made accessible at the far-end of the network by one CPE utilizing the other CPE's connection to the central office.

FIG. 2 shows a scenario with a customer premises 201 comprising a CPE1 202 and a CPE2 203. The CPE1 202 is connected via a DSL line 206 with a Central Office CO 207 and the CPE2 203 is connected via a DSL line 207 with the CO 207. The CO 207 is further connected to a Multipath Router 208.

The CPE1 202 hence comprises a first interface to be connected to the Internet via DSL line 206 and a second interface to set up an ad-hoc wireless network communication to the CPE2 203 thereby utilizing an additional connection to the Internet.

CPE1 202 and CPE2 203 may communicate with each other via an air interface, via powerline or via a fixed line. Preferably, a CPE recognized on its own via ad-hoc functionality which CPE it can be connected to. Thus, CPEs may exchange user information. This preferably allows optimizing data transfer at the far-end, i.e. at the user's premises 201.

It is advantageous to have a couple of CPEs available at the far-end: The more CPEs that are available at the customer's premises 201 (and are set up to interact with each other and in particular to provide a connection to the Internet on their own) the better (overall data) traffic can be optimized.

Optionally, a network provided may install firmware (that may be automatically uploaded via the Internet) in order to set up each WLAN/DSL router in a way that it allows communication with adjacent WLAN/DSL routers as described herein.

Figure 3:
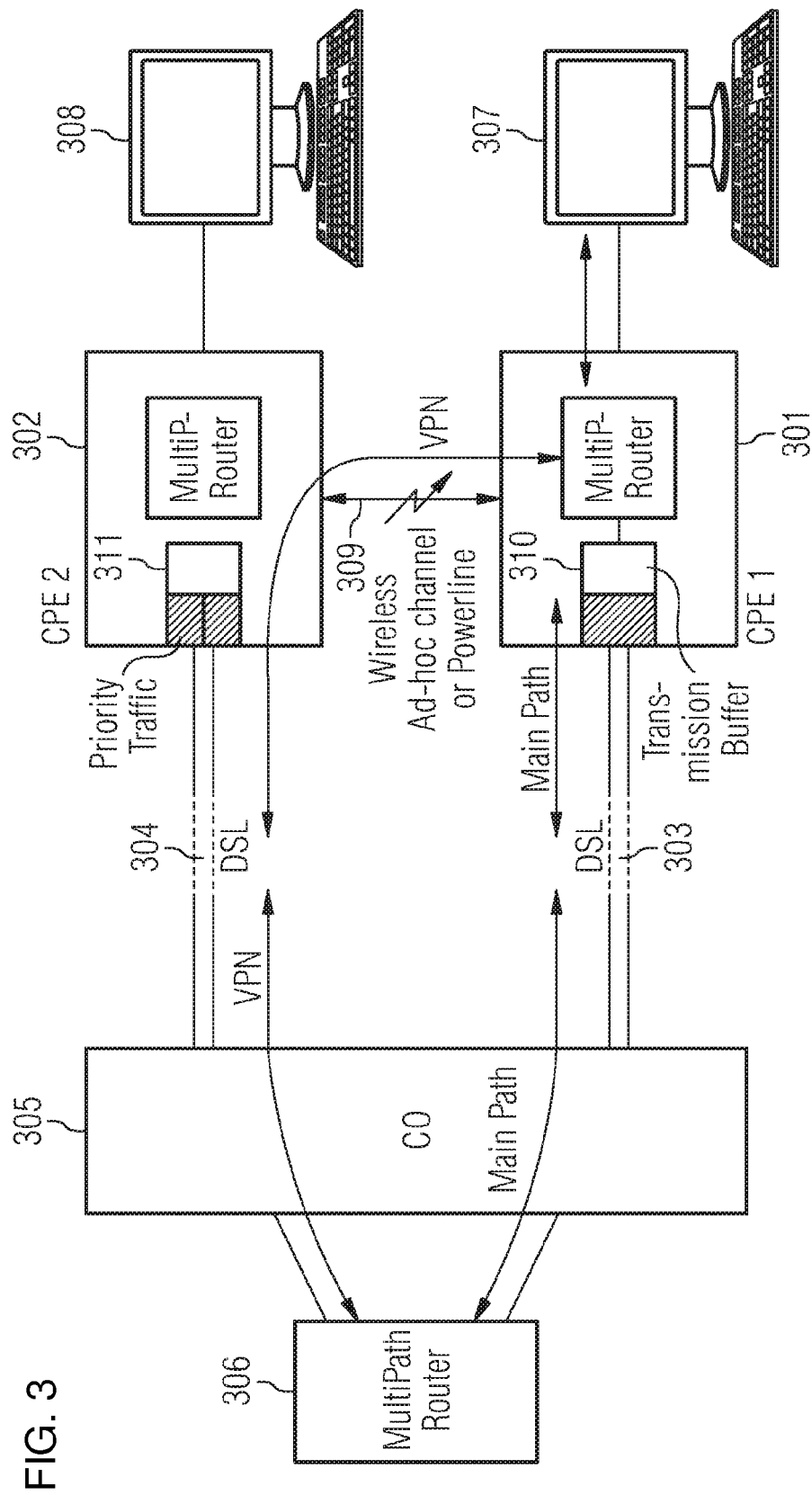
FIG. 3 shows a more detailed scenario of traffic flow from/to one CPE via two interfaces, wherein one interface is directly connected to the central office and the other interface utilizes another CPE's network connection to the central office.

FIG. 3 shows a more detailed scenario comprising a CPE1 301 that is connected via a DSL line 303 to a Central Office CO 305 and a CPE2 302 that is connected via a DSL line 304 to the CO 305.

The CO 305 is further connected to a Multipath Router 306 and to the Internet.

The CPE1 301 is connected to a personal computer 307 and the CPE2 302 is connected to a personal computer 308. An ad-hoc channel 309 (alternatively realized as a powerline connection) connects the CPE1 301 and the CPE2 302.

An advantage of the approach provided herewith is the bundling effect of the DSL lines. Common Internet traffic is based on data burst irregularly utilizing existing connections to the Internet. In many cases, a connection is not used over a long period although the connection as well as the modem are active.

Such an active but not used connection to the Internet can be utilized by the approach provided herewith.

An uplink of DSL lines in many cases is considered a bottle-neck. According to FIG. 3 a user transmits via CPE1 301 data towards the Internet. If this is done via DSL line 303 only, it will result in an overflow of the transmission buffer 310. However, this approach allows the CPE1 301 to utilize the DSL line 304 of the CPE2 302 as well: Hence data to be conveyed from the CPE1 301 towards the Internet can be distributed via an interface to DSL line 303 and an wireless interface towards CPE2 302. The CPE2 302 has also a transmission buffer 311 that can be (at least partially) filled by the CPE1 301 via the wireless channel 309.

Hence, the bandwidth available for uplink data transmission may be twice as high compared to only CPE1 301 being present. The bandwidth increases further if additional CPEs are present.

It is to be noted that the approach provided can be utilized for downlink data transmission as well. Preferably, an internal structure of communicating CPEs at the far-end (within the customer's premises) can be forwarded to the CO 305 and/or the Multipath Router 306. In such case, data traffic can be distributed among several DSL lines even if only one CPE is receiving the data forwarded.

It is a further advantage that in case of line failure traffic can be kept up via—according to FIG. 3—the alternative DSL line 303 or 304. Both CPEs can be reached via either one of the DSL lines 303 or 304. A failure can be notified e.g. by a CPE to the CO 305 via the alternative route (e.g. the DSL line of the respective other CPE).

The invention claimed is:

1. A data communication method for communication between a first customer premises equipment and a network, which comprises:
providing a first interface in the first customer premises equipment and a first available bandwidth for bidirectional communication between the first customer premises equipment and the network;
providing a second interface in the first customer premises equipment to transfer overflow data traffic between the first customer premises equipment and a second customer premises equipment;

providing a second available bandwidth for bidirectional communication between the second customer premises equipment and the network;

transmitting data traffic between the first customer premises equipment and the network using the first available bandwidth;

when the first available bandwidth is exhausted, transferring the overflow data traffic between the first customer premises equipment and the second customer premises equipment via the second interface, and transmitting the overflow data traffic between the second customer premises equipment and the network using the second available bandwidth;

wherein the overflow data traffic is data traffic that cannot be transmitted using the first available bandwidth; and wherein the second interface includes at least one of:
 a wireless interface;
 a powerline interface; or
 a wireline interface.

2. The method according to claim 1, which comprises connecting the first customer premises equipment via an ad-hoc channel through the second interface.

3. The method according to claim 1, which comprises connecting the first customer premises equipment via an ad-hoc network through the second interface.

4. The method according to claim 1, wherein the network is a common access network.

5. The method according to claim 4, wherein the network is the Internet.

6. A device for data processing, comprising a processor unit programmed to execute the method according of claim 1 on a processor thereof.

7. The device according to claim 6, wherein the device is a communication device.

8. A communication system, comprising the device according to claim 6.

9. A communication system, configured to execute the method according of claim 1.

10. A first customer premises equipment, comprising:
a first interface configured to establish bidirectional communication between the first interface and a network and to transmit data traffic;
a second interface configured to transfer overflow data traffic between the second interface and the network via a second customer premises equipment when an available bandwidth for bidirectional communication between the first interface and the network is exhausted, wherein the overflow data traffic is data traffic that cannot be transmitted using the available bandwidth;
the second interface being one of:
 a wireless interface;
 a powerline interface; or
 a wireline interface.

11. A second customer premises equipment, comprising:
a first interface configured to transfer overflow data traffic of a first customer premises equipment between the first customer premises equipment and the first interface when an available bandwidth for bidirectional communication between the first customer premises equipment and a network is exhausted, wherein the overflow data traffic is data traffic that cannot be transmitted using the available bandwidth; and
a second interface configured to establish bidirectional communication between the second interface and the network to transfer the overflow data traffic;
the first interface being one of:
 a wireless interface;
 a powerline interface; or
 a wireline interface.

\* \* \* \* \*